Nov. 16, 1926.
1,607,215
C. B. SPASE
CLUTCH
Filed Dec. 4, 1923      2 Sheets-Sheet 2
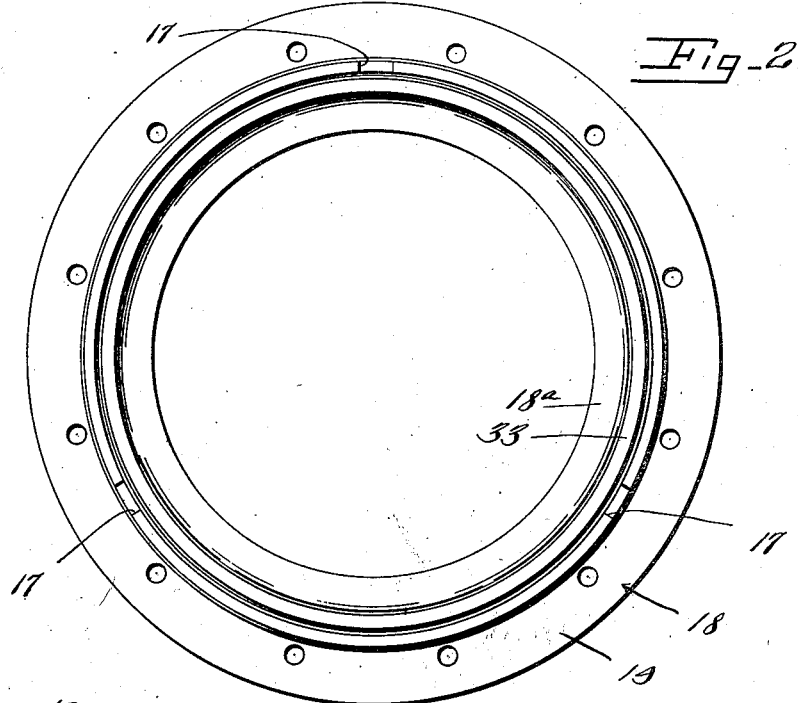
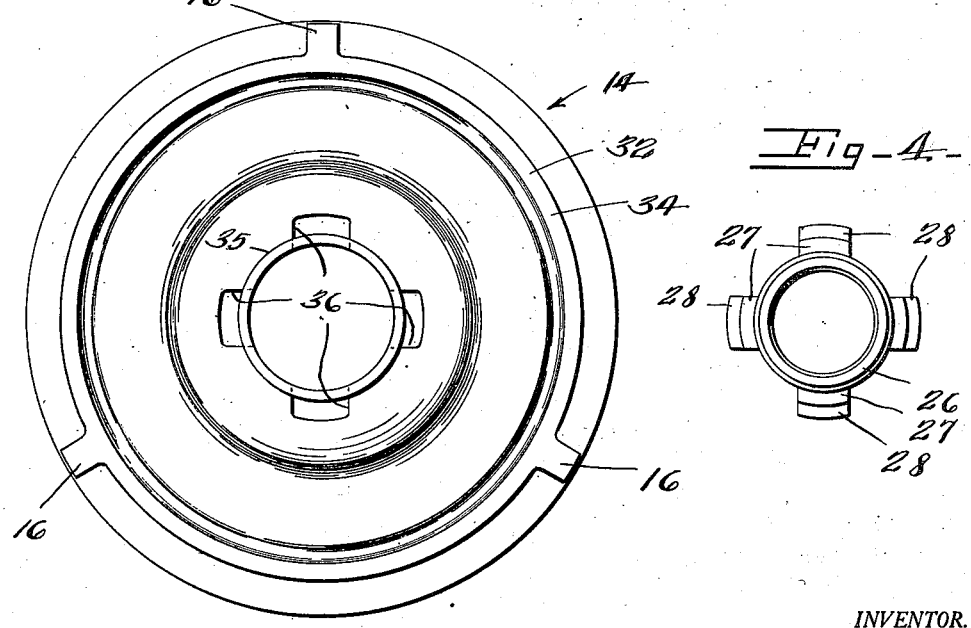
INVENTOR.
Charles B. Spase
BY
James A. Bodell
ATTORNEYS.

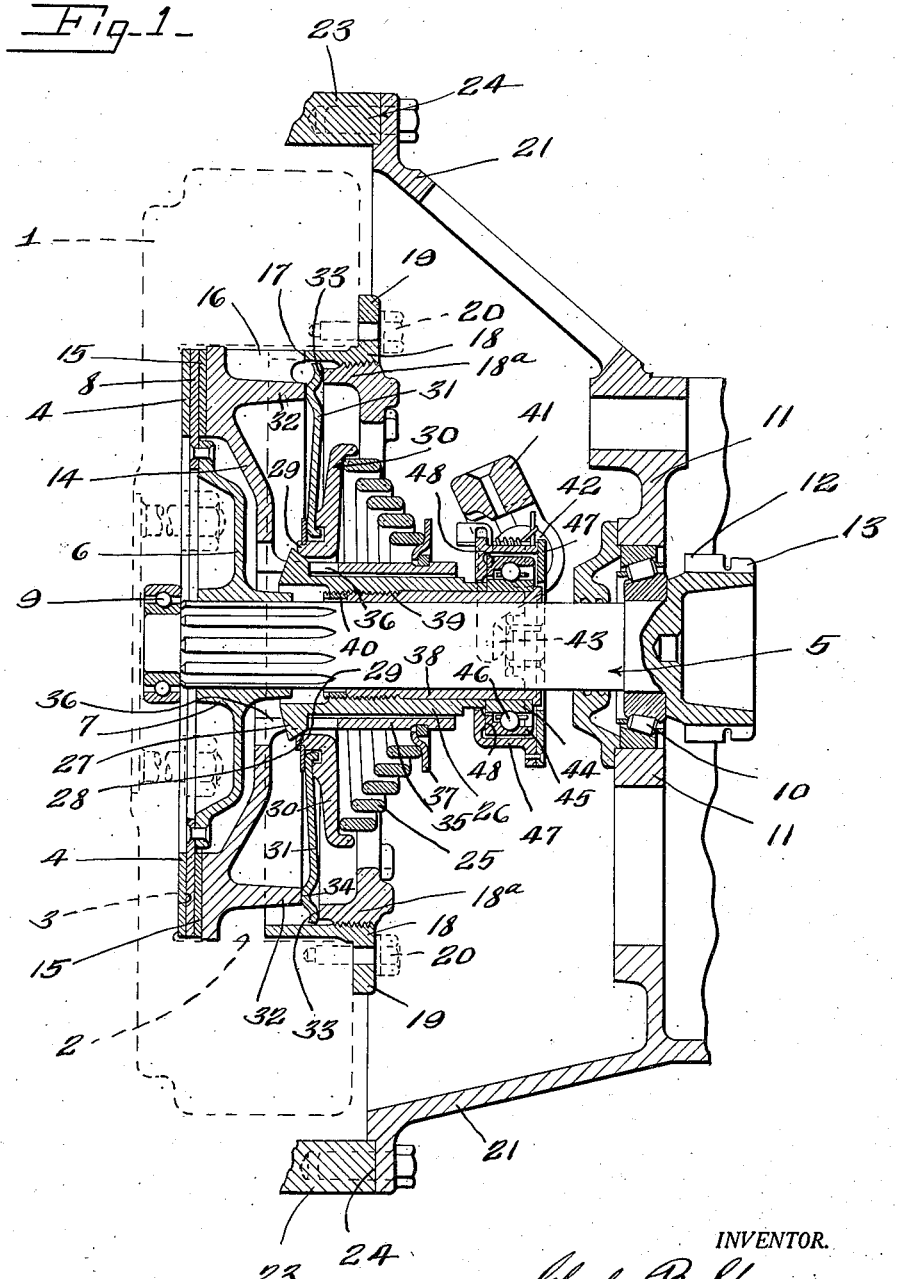

Patented Nov. 16, 1926.

1,607,215

UNITED STATES PATENT OFFICE.

CHARLES B. SPASE, OF SYRACUSE, NEW YORK, ASSIGNOR TO BROWN-LIPE GEAR COMPANY, OF SYRACUSE, NEW YORK, A CORPORATION OF NEW YORK.

CLUTCH.

Application filed December 4, 1923. Serial No. 678,517.

This invention relates to clutches and to power plant units such as embody a clutch and a transmission gearing, the case or housing of which is attached to the engine or flywheel case or housing and has for its object a particularly simple and efficient construction by which variations of the coacting surfaces of the clutch and the casings or housings out of their theoretically correct positions and variations in the alinement of the clutch shaft which is also the driving shaft of the transmission gearing, are compensated for, or equalized or permitted without interfering with the free and equal action of the clutch and particularly without interfering with the operation of the throwout collar or sleeve mounted on such shaft, and operable to control the engaging and disengaging of the friction faces, plates or disks of the clutch.

The invention consists in the novel features and in the combinations and constructions hereinafter set forth and claimed.

In describing this invention, reference is had to the accompanying drawings in which like characters designate corresponding parts in all the views.

Figure 1 is a fragmentary, sectional view of a clutch and power plant unit embodying my invention.

Figure 2 is an inner face view of the ring associated with the driving member of the clutch or flywheel of the engine with which the pressure member slidably interlocks.

Figure 3 is a rear elevation of the pressure member or ring.

Figure 4 is an end elevation of a detached operating or throwout sleeve.

In friction clutches, such as are used in motor vehicles, the central shaft of the clutch, which is also the driving shaft of the transmission gearing, is supported at its front end in a pilot bearing in the flywheel or driving member of the clutch and at its rear end is supported in a bearing in the front wall of the casing of the transmission gearing, such shaft being theoretically in axial alinement with the driving member. Also the frictionally engaged faces of the driving and driven members and hence of the pressure element engaging or compressing such faces, are arranged theoretically normal with the axis of the driving and driven members of the clutch, that is, in the clutch here shown in which annular flat friction faces are illustrated, they are theoretically arranged in planes at right angles or normal to the axis of the driving member or flywheel and the central shaft of the clutch.

Also, in some instances, the pressure element and the driving member have faces with which clutch levers coact and these faces are also theoretically arranged in planes at a right angle or normal to the axis of the driving member or flywheel and the shaft. Also the case or housing of the transmission gearing, and the portion of the engine casing enclosing the flywheel, have abutting faces which are secured together and which are theoretically in a normal relation to, and usually located in planes at right angles to, the axis of the flywheel and the shaft and also in the clutch construction or assembly there are other abutting faces which are theoretically normal or arranged in planes at a right angle to the axis of the shaft and the flywheel.

However, the shaft is subject to variations out of its theoretical alinement, due to variations out of the normal of the abutting surfaces of the transmission gear casing and flywheel casing and such variations in alinement throw the friction faces of the driving and driven members out of a normal position. Such variations out of the normal are bound to occur, due to inaccurate machining or to the impossibility of producing such surfaces absolutely accurate when manufacturing in quantities.

In other words, variations in such surfaces out of the normal or theoretically correct positions are bound to occur, and such variations cause the friction surfaces to engage unequally at different points of their areas when they should engage substantially equally throughout their areas, and such variations also cause the pressure of the pressure ring to be applied more or less unequally throughout the area of its friction face and also cause the pressure of the main spring and of the clutch and throwout sleeve to be applied unequally to the pressure ring and further cause the throwout sleeve to bind on the shaft, so as not to operate easily.

My invention comprises means by which such inequalities and variations are compensated for and the binding of the clutch throwout sleeve prevented.

This friction clutch comprises generally driving and driven members including a shaft arranged centrally of the clutch construction and arranged in theoretical alinement with the driving member and subject to variations out of such alinement, the driving and driven members having coacting friction surfaces arranged theoretically normal with the axis of the driving member and subject to variations out of the normal, a pressure element or ring having an annular face for pressing the former faces together and arranged theoretically normal to the axis of the driving member, means for operating the pressure ring comprising a main spring for moving the ring in one direction and a part termed for convenience, a throwout sleeve slidable axially of the shaft and partaking of the variations in alinement thereof, connections between such sleeve and the pressure element or ring including a joint having a universal action, one section of the joint being carried by the sleeve and arranged concentric therewith and the other section of the joint having a universal action relatively to the former section whereby variations in the alinement of the shaft and variations out of the normal of coacting surfaces of the driving and driven members and the pressure ring are equalized or compensated for.

I have here illustrated my invention as embodied in a clutch of the single plate type although it may be embodied in other types of friction clutches.

1 designates the driving member which is usually the flywheel of the internal combustion engine of the motor vehicle, the flywheel being usually formed with a cylindrical recess 2 therein having a substantially flat inner wall or bottom 3 provided with an annular friction plate 4 thereon. This surface 3 and the plate 4 are theoretically normal to the axis of the flywheel 1 but in manufacturing in quantities unavoidable variations out of the normal or out of a plane at a right angle to the axis of the flywheel occur.

The driven member includes the shaft 5 arranged centrally of the clutch construction and a friction plate 6 having a hub 7 splined to and slidable axially of the shaft 5, the plate 6 having annular friction plate or disk 8 coacting with the friction disk 4 of the driving element 1. This shaft 5 has a pilot bearing at its front end at 9 in the flywheel 1 and is journalled at its rear end in a bearing 10 supported in the front wall 11 of the transmission gear case, the shaft 5 being the driving shaft of the usual change speed gearing embodied in motor vehicles and having formed integral therewith at its inner end, a gear 12 and a clutch face 13 for a purpose well understood by those skilled in the art. The pilot bearing 9 is here shown as a ball bearing capable of having a universal action within limits, in order to permit the shaft 5 to operate when slightly out of alinement with the flywheel.

14 is the pressure element or ring having an annular face which is provided with an annular disk 15 for pressing the plate 8 against the friction disk 4 of the driving member and this face and the disk 15 are also theoretically normal or, in this embodiment of my invention, in a plane at a right angle with the axis of the driving member 1.

As here illustrated, the pressure ring is interlocked with the driving member 1 to rotate therewith and is floatingly mounted to conform to any variations out of the normal of the face 3 and disk 4 in order to act on the plate 8 and press the same equally throughout its area against the disk 4. The pressure ring 14 is mounted to be entirely free of misalinements of the shaft 5. Preferably, the pressure element or ring 14 is interlocked with the driving member 1 at three points which are spaced equidistant apart and, as illustrated, the ring is formed with three radial tongues 16 which slidably interlock in three notches 17 formed in another ring 18 secured to the rear face of the flywheel 1. The three tongues 16 and the slots 17 permit the ring to tilt in all radial directions to conform to variations out of the normal of the friction surfaces of the driving and driven members and the pressure ring but at the same time hold the ring concentric with the axis of the driving member 1. The ring 18, as here shown, extends into the recess 2 from the rear end thereof and has a flange 19 lapped on the rear face of the flywheel 1 and secured thereto in any suitable manner as by screws 20.

The gear casing 11 is also provided with a flange 21, which is a forwardly extending flange or housing secured at its front end to the rear end of the portion of the engine casing 23 inclosing the flywheel or driving member 1, this housing 21, and the engine casing 23 having abutting faces at 24 which are theoretically arranged normal to the axis of the flywheel 1 and the shaft 5 but which are subject to variations out of the normal. Such variations out of the normal tend to throw the shaft 5 out of alinement with the driving member 1.

The pressure ring 14 in clutches used in motor vehicles is pressed into operative position by a powerful spring 25, and is withdrawn out of operative position against the pressure of the spring, and hence, controlled by a part as a sleeve 26 mounted on and shiftable axially of the shaft 5, the sleeve being guided in its movement by the shaft, and hence, being subject to the variations in the alinement of the shaft. The sleeve is moved in one direction by the spring 25 and in the other direction by the usual clutch lever or pedal.

Heretofore, owing to the variations in the coacting surfaces of the clutch parts and the housings therefor tending to either carry the shaft 5 out of exact alinement with the driving member 1, and to carry the other surfaces of the clutch out of normal, or owing to the friction surfaces and the clutch being out of normal or owing to both of these conditions, the sleeve binds or works hard on the shaft and the clutch operates hard and unevenly.

In my clutch in order to compensate for these conditions a joint having a universal action is located between the sleeve 26 and the pressure ring 14 or between the sleeve and the parts which transmit the motion to the pressure ring, one section of such joint being carried by the sleeve 26 and arranged concentric with the shaft in all of its variations, and the other section of the joint being capable of a universal action relatively to the former section.

As here illustrated the section 27 is provided on the inner end of the sleeve and comprises a plurality of radially extending arms, see Fig. 4, having inclined or spherical surfaces 28 at their ends, or surfaces acting as spherical surfaces, and the other section 29 is provided on the hub of a spring abutment 30, the hub encircling the ends of the arms 27 and engaging the surfaces 28 to have a universal action relatively thereto. The spring 25 thrusts against the spring abutment and the hub or universal joint section 29 thereof thrusts against the universal joint section 27 of the sleeve 26. Upon movement of the sleeve 26 to the right against the action of the spring 25, such movement being effected by the clutch pedal, the spring abutment 30 is also moved to the right to compress the spring and relieve the pressure ring 14 of the action of the spring, so that, the friction surfaces of the driving and driven members are disengaged.

The motion of the spring abutment 30 is transmitted to the pressure ring 14 by a plurality of outwardly extending levers 31, connected at their inner ends to the spring abutment 30, fulcruming near the extreme outer ends against the fulcrum ring 18ª and pressing near their outer ends against the pivot ring 32 on the rear side of the pressure ring 14. The fulcrum ring 18ª is provided with an annular bearing surface at 33 and also the pivot ring 32 has an annular surface 34. These surfaces 33, 34 are also theoretically normal or at a right angle to the axis of the driving member 1, and subject to variations out of the normal.

The action of the universal joint sections 27, 28 also compensates for variations out of the normal of such surfaces 33, 34, as well as variations of the surfaces 24 between the transmission gear case, and the engine case 23, and the surfaces of the driving and driven members 15, and the pressure ring. The fulcrum ring 18ª is adjustably mounted in the ring 18 and is here shown threaded into such ring 18. It is adjustable to take up looseness and wear.

In the clutch here illustrated the spring 25 also acts to withdraw the pressure ring and acts on the pressure ring in one direction through the levers 31 and in the other direction directly upon the pressure ring, and to effect this result the pressure ring 14 is formed with a hub 35 encircling the sleeve 26. The hub 35 is spaced apart therefrom, to permit the variations in the alinement of the shaft 5 without interfering with the pressure ring and to permit movement of the ring 14 out of alinement with the shaft due to the variations in friction or other surfaces of the clutch members. This hub 35 is provided with slots 36 through which the radial arms 27 of the universal joint extend and the spring 25 encircles the hub 35 and thrusts at one end against the abutment 30 and at its other end against an abutment 37 on the rear or outer end of the hub 35.

The sleeve 26 is here shown as consisting of inner and outer sections, the inner section 38 threading into the outer section at 39 and the two sections being locked together by a ring nut 40.

The sleeve 26 is controlled in its operation or shifted outwardly to release the clutch against the action of the spring 25, by suitable means as a yoke 41, mounted upon shaft sections as 42 and having arms 43 pressing against a bearing on the outer end of the sleeve 26. The bearing consists of inner and outer rings 44, 45 and balls 46, between the rings, and this bearing is enclosed in a housing 47. The housing has diametrically opposite fulcrum points 48 thrusting against the bearing or the outer ring thereof, to permit the housing to rock and equalize or conform to the variations of the shaft 5 out of alinement, and the variations in the shafts 42 which are mounted in the clutch housing 21. Owing to the housing 47 being so fulcrumed, binding or unequal action between the yoke and the throwout bearing due to misalinements of the shaft or of the housing is compensated for. One of the shaft sections 42 is provided with the usual clutch pedal, not shown.

In operation when the shaft 5 which is the driving shaft of the transmission gearing, and other clutch parts associated therewith, are assembled in the driving member and the housing 21 secured to the engine casing 23, the friction faces of the driving and driven members and other parts of the clutch will engage substantially equally regardless of inequalities or variations out of the normal thereof, regardless of any variations of the shaft 5 out of alinement with the driving member 1, and regardless of variations out of normal of the abutting surfaces as 24 out of alinement as any and all of such variations are compensated for by the floating pressure ring and the universal joint between the clutch throwout sleeve and the pressure ring.

Furthermore, as the spring of the clutch is carried by the floating pressure ring, the pressure thereof is always transferred equally to the pressure ring and is not affected by variations in the alinement of the shafts.

What I claim is:

1. In a clutch, the combination of driving and driven members, including a shaft supported in theoretical axial alinement with the driving member, and subject to variations out of such alinement, the driving and driven members having coacting annular friction faces arranged theoretically normal with the driving member and the shaft, and subject to variations out of normal, a floating axially shiftable element, having an annular face adapted to compress the former faces into engagement, said element being mounted to conform to the variations out of normal of said faces, whereby said faces engage substantially equally throughout their areas, means for operating said element, comprising a part slidable axially of the shaft and partaking of the variations in the alinement thereof, and connections between said part and said element comprising a joint which permits said element to conform to such variations and the sleeve to conform to variations in the alinement of the shaft.

2. In a clutch, the combination of driving and driven members, including a shaft supported in theoretical axial alinement with the driving member and subject to variations out of such alinement, the driving and driven members having coacting annular friction faces arranged theoretically normal with the driving member and the shaft and subject to variations out of the normal, a floating axially shiftable element having an annular face for compressing the former faces into engagement, said element being mounted to conform to the variations out of the normal of said faces, whereby said faces engage substantially equally throughout their areas, means for operating said element, comprising a part slidable axially of the shaft and partaking of variations in the alinement of the shaft, and connections between said part and said member comprising a joint having a universal yielding action, one section of such joint being carried by said part and arranged concentric of said shaft, and the other being capable of universal yielding action.

3. In a clutch, the combination of driving and driven members, including a shaft supported in theoretical axial alinement with the driving member, and subject to variations out of such alnement, a pressure ring, a sleeve mounted on the shaft and shiftable axially thereof, and subject to the variations in the alinement of the shaft, the driving and driven members and the pressure ring having annular friction surfaces arranged theoretically normal with the axis of the driving member, and subject to variations out of the normal, and the pressure ring and the driving element also having other annular friction surfaces arranged theoretically normal and subject to variations out of the normal the pressure ring being mounted to float relative to the driving element and the shaft, and to conform to the variations in such surfaces, a spring abutment encircling the sleeve, a spring acting on such abutment, levers for transmitting the motion of the abutment to the pressure ring, the levers coacting with the last menioned annular surfaces and a connection between the sleeve and the abutment to permit the abutment to have a universal action relative to the sleeve and the shaft, and means for operating the sleeve against the action of the spring.

4. In a clutch, the combination of driving and driven members, including a shaft supported in theoretical axial alinement with the driving member, and subject to variations out of such alinement, a pressure ring, a sleeve mounted on the shaft and shiftable axially thereof, and subject to the variations in the alinement of the shaft, the driving and driven members and the pressure ring having a plurality of annular surfaces arranged theoretically normal with the axis of the driving member, and subject to variations out of the normal, the pressure ring being mounted to have a floating movement relative to the shaft and the driving member to conform to the variations in such surfaces, a spring abutment encircling the sleeve, a spring acting on such abutment, levers for transmitting the motion of the abutment to the pressure ring, the levers coacting with some of said annular surfaces on the pressure ring and on the driving member and a connection between the sleeve and the abutment including a universal joint section carried by the sleeve concentric therewith and with the shaft, and a section associated with the abutment and capable of universal yielding action relatively to the former section and means for shifting the sleeve against the action of the spring.

5. In a clutch, the combination of driving and driven members, including a shaft supported in theoretical alinement with the driving member, and subject to variations out of such alinement, the shaft being journalled at its front end in the driving member, a casing having a bearing supporting the outer end of the shaft, a casing enclosing the driving member, the former casing being secured to the latter and such casings having abutting faces arranged in theoretically normal relation to the axis of the driving and driven members, and subject to variations out of the normal, a pressure element, the driving and driven members and the pressure element having annular faces for frictionally engaging each other arranged theoretically normal to the axis of the driving member and subject to variation out of the normal, and the pressure element and the driving member having other annular faces arranged theoretically normal to the axis of the driving member and subject to variations out of the normal, a sleeve slidable axially of the shaft and partaking of variations in alinement thereof, a spring abutment surrounding the sleeve, a spring acting on the abutment in one direction, a universal joint between the sleeve and the abutment, levers extending outwardly from the abutment coacting at their inner ends with the abutment, and near the outer ends with such other faces with the pressure element and the driving member, and means for shifting the sleeve in the other direction.

6. In a clutch, the combination of driving and driven members, including a shaft supported in theoretical alinement with the driving member, and subject to variations out of such alinement, the shaft being journalled at its front end in the driving member, a casing having a bearing supporting the outer end of the shaft, a casing enclosing the driving member and supporting the same, the former casing being secured to the latter and such casings having abutting faces arranged in a theoretically normal relation to the axis of the driving and driven members, and subject to variations out of the normal, a pressure element, the driving and driven members and the pressure element having annular faces, for frictionally engaging each other arranged theoretically normal to the axis of the driving member and subject to variations out of the normal, and the pressure element and the driving member having other annular faces arranged theoretically normal to the axis of the driving member and subject to variations out of the normal, a sleeve slidable axially of the shaft, and partaking of the variations in alinement thereof, a spring abutment surrounding the sleeve, a spring acting on the abutment in one direction, a universal joint between the sleeve and the abutment, levers extending outwardly from the abutment coacting at their inner ends with the abutment, and near the outer ends with such other faces of the pressure element and the driving member, and means for shifting the sleeve in the other direction, said means including a yoke carried by the first mentioned casing and connected to the sleeve by a rocking joint.

7. In a clutch, the combination of driving and driven members, including a shaft, arranged centrally of the clutch, a pressure ring, the driving and driven members and the pressure ring having coacting friction surfaces, a spring for thrusting the pressure ring in one direction, motion transmitting means between one end of the spring and the pressure ring, including a spring abutment, and levers for transmitting the motion of the spring abutment to the ring, an abutment on the pressure ring for the other end of the spring, a throwout sleeve mounted on the shaft and slidable axially thereof, and being disengaged from the pressure ring, a universal joint between the sleeve and the first named abutment, one section of the joint being provided on the sleeve, and the other on the spring abutment, and the latter being capable of universal movement relatively to the former, and means for operating the sleeve against the action of the spring.

In testimony whereof, I have hereunto signed my name, at Syracuse, in the county of Onondaga, in the State of New York, this 1st day of December, 1923.

CHARLES B. SPASE.